(12) United States Patent
Santini

(10) Patent No.: US 12,104,637 B1
(45) Date of Patent: Oct. 1, 2024

(54) LOCKING FASTENER UTILIZING AN INSERTED KEY

(71) Applicant: Patrick J. Santini, West Bend, WI (US)

(72) Inventor: Patrick J. Santini, West Bend, WI (US)

( * ) Notice: Subject to any disclaimer, the term of this patent is extended or adjusted under 35 U.S.C. 154(b) by 286 days.

(21) Appl. No.: 17/895,136

(22) Filed: Aug. 25, 2022

(51) Int. Cl.
*F16B 39/28* (2006.01)
*F16B 39/04* (2006.01)

(52) U.S. Cl.
CPC .................................... *F16B 39/04* (2013.01)

(58) Field of Classification Search
CPC ................................. F16B 39/04; F16B 39/06
USPC ........ 411/110, 116, 124, 128, 129, 131, 132, 411/140, 216, 217, 221
See application file for complete search history.

(56) References Cited

U.S. PATENT DOCUMENTS

| | | | | |
|---|---|---|---|---|
| 514,623 | A * | 2/1894 | King | |
| 1,194,060 | A * | 8/1916 | Oberdier | F16B 39/06 411/944 |
| 1,369,002 | A * | 2/1921 | Bentz | F16B 39/06 411/944 |
| 1,719,069 | A * | 7/1929 | McGlynn | F16B 39/06 411/293 |
| 1,879,290 | A * | 9/1932 | Johnson | F16B 39/06 411/948 |
| 2,367,399 | A * | 1/1945 | Isakson | F16B 39/06 411/277 |
| 2,855,970 | A | 5/1956 | Neuschotz | |
| 3,472,302 | A | 10/1969 | Rosan, Sr. et al. | |
| 3,537,118 | A | 11/1970 | Neuschotz | |
| 3,650,309 | A * | 3/1972 | Neuschotz | F16B 37/122 411/110 |
| 4,895,485 | A * | 1/1990 | Guevara | F16B 39/06 411/110 |
| 2021/0310506 | A1 * | 10/2021 | Phan | F16B 41/002 |

* cited by examiner

*Primary Examiner* — Gary W Estremsky
(74) *Attorney, Agent, or Firm* — Donald J. Ersler

(57) ABSTRACT

A locking fastener utilizing an inserted key preferably includes a fastener and a lock key. The fastener includes a drive head and a threaded shank. The drive head is preferably a countersunk head. A drive cavity is formed in a top of the drive head. The threaded shank extends from a bottom of the drive head. The lock key preferably includes a tapered head and a shank. The shank extends downward from a bottom of the tapered head. A head projection extends outward from a rear of the tapered head. At least one shank projection extends outward from a front of the shank. A key slot is formed in a side of the drive head and a side of the threaded shank. A head retention slot is formed in the key slot, adjacent a top of the drive head to receive the head tapered projection.

17 Claims, 3 Drawing Sheets

LOCKING FASTENER UTILIZING AN INSERTED KEY

BACKGROUND OF THE INVENTION

1. Field of the Invention

The present invention relates generally to assembling objects and more specifically to a locking fastener utilizing an inserted key, which does not require a locking washer or a chemical compound to prevent the fastener from loosening itself from a threaded hole.

2. Discussion of the Prior Art

It appears that the prior art does not teach or suggest preventing a flat head fastener or a fastener with a flush mounted head from loosening itself from a threaded hole. A lock washer cannot be used with the flat head fastener or the fastener with the flush mounted head. Sometimes chemical locking compounds do not prevent the fastener from loosening from a threaded hole. U.S. Pat. No. 2,855,970 to Neuschotz discloses an insert having frictionally retained key which upsets threads of a base member. U.S. Pat. No. 3,472,302 to Rosan, Sr. et al. discloses an insert with prism lock pin. U.S. Pat. No. 3,537,118 to Neuschotz discloses a formation of fasteners having keys.

Accordingly, there is a clearly felt need in the art for a locking fastener utilizing an inserted key, which does not require a locking washer or a chemical compound to prevent the fastener from loosening itself from a threaded hole.

SUMMARY OF THE INVENTION

The present invention provides a locking fastener utilizing an inserted key, which does not require a locking washer or a chemical compound to prevent the fastener from loosening itself from a threaded hole. The locking fastener utilizing an inserted key (locking fastener with key) preferably includes a fastener and a lock key. The fastener includes a drive head and a threaded shank. The drive head is preferably a countersunk head, but other heads could also be used. A drive cavity is formed in a top of the drive head. The drive cavity may be a hexagon drive cavity, a square drive cavity, a Torx® drive cavity, a Philips drive cavity, a slot drive cavity or any other suitable drive cavity. The threaded shank extends from a bottom of the drive head. The lock key preferably includes a tapered head and a shank. The shank extends downward from a bottom of the tapered head. A head tapered projection extends outward from a rear of the tapered head. At least one shank tapered projection extends outward from a front of the shank. A tapered portion of the head tapered and shank tapered projections faces downward from both the head tapered projection and the shank tapered projection.

A key slot is formed in a side of the drive head and a side of the threaded shank. The key slot stops just above an opposing end of the threaded shank to prevent the lock key from being inserted too far downward. A head retention slot is formed adjacent a top of the drive head to receive the head tapered projection. In use, the locking fastener is inserted through a first object and tightened in a threaded hole in a second object. The lock key is inserted into the key slot in the drive head and forced downward, until a top of the tapered head is flush with a top of the drive head. The head tapered projection retained in the head retention slot will prevent the lock key from working itself upward out of the key slot. The at least one shank tapered projection will prevent the threaded shank from rotating relative to the threaded hole.

Accordingly, it is an object of the present invention to provide a locking fastener with key, which does not require a locking washer or a chemical compound to prevent the fastener from loosening itself from a threaded hole.

These and additional objects, advantages, features and benefits of the present invention will become apparent from the following specification.

DETAILED DESCRIPTION OF THE PREFERRED EMBODIMENTS

Figure 1:
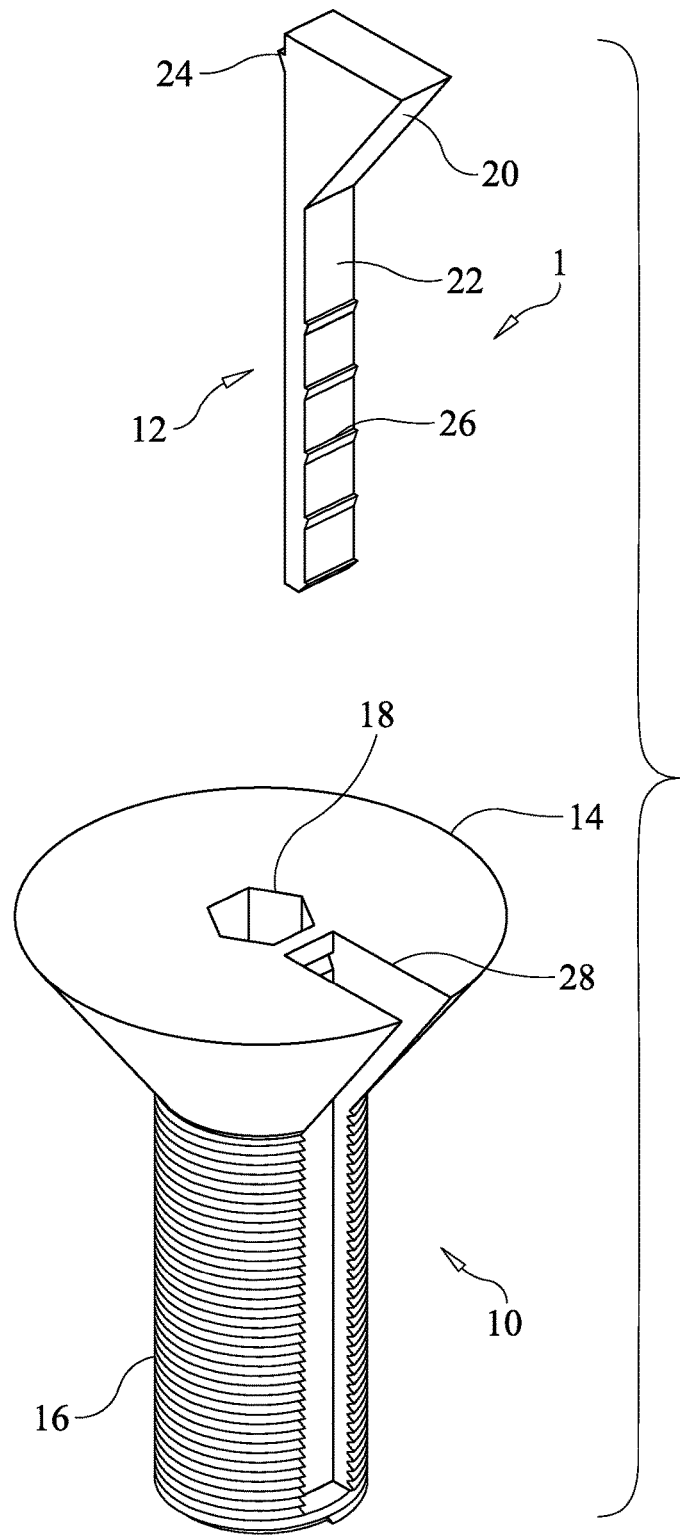
FIG. 1 is an exploded perspective view of a locking fastener with key in accordance with the present invention.
Figure 2:
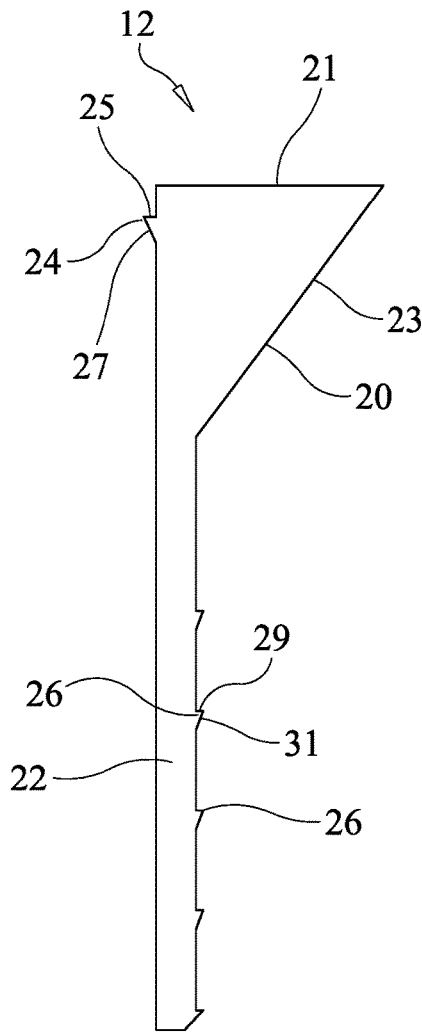
FIG. 2 is a side view of a lock key of a locking fastener with key in accordance with the present invention.
Figure 3:
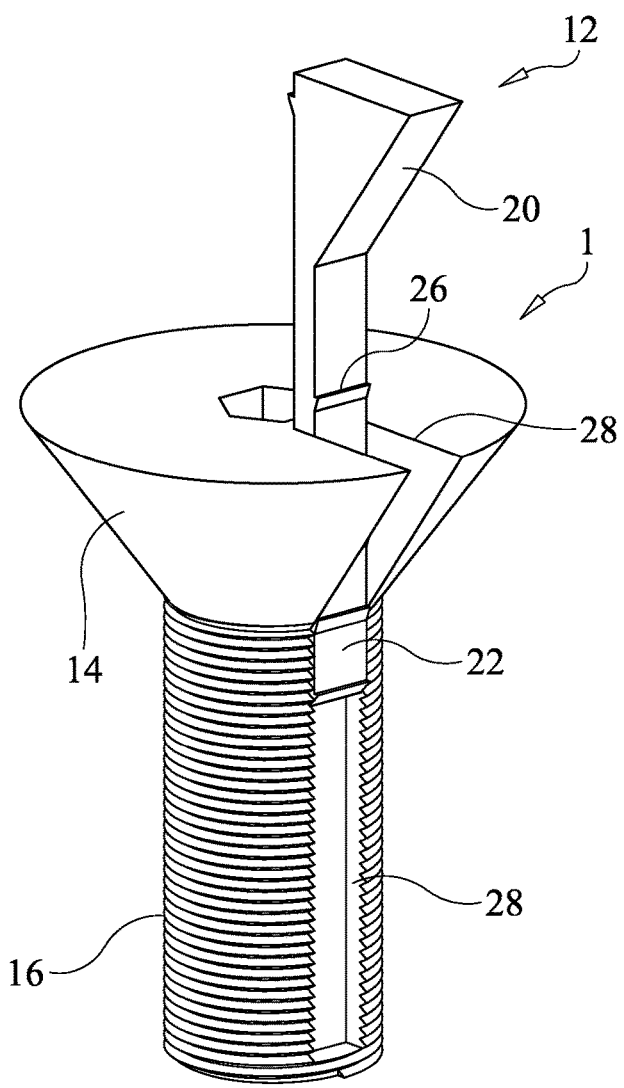
FIG. 3 is a perspective view of a lock key partially inserted into a drive head of a locking fastener with key in accordance with the present invention.
Figure 4:
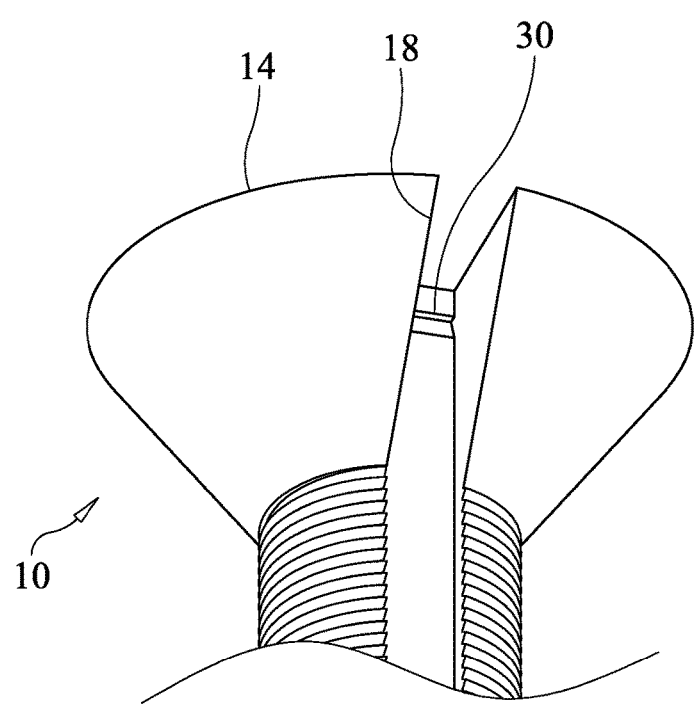
FIG. 4 is a bottom perspective view of a drive head illustrating a head retention slot, which is sized to receive a head tapered projection of a locking key of a locking fastener with key in accordance with the present invention.
Figure 5:
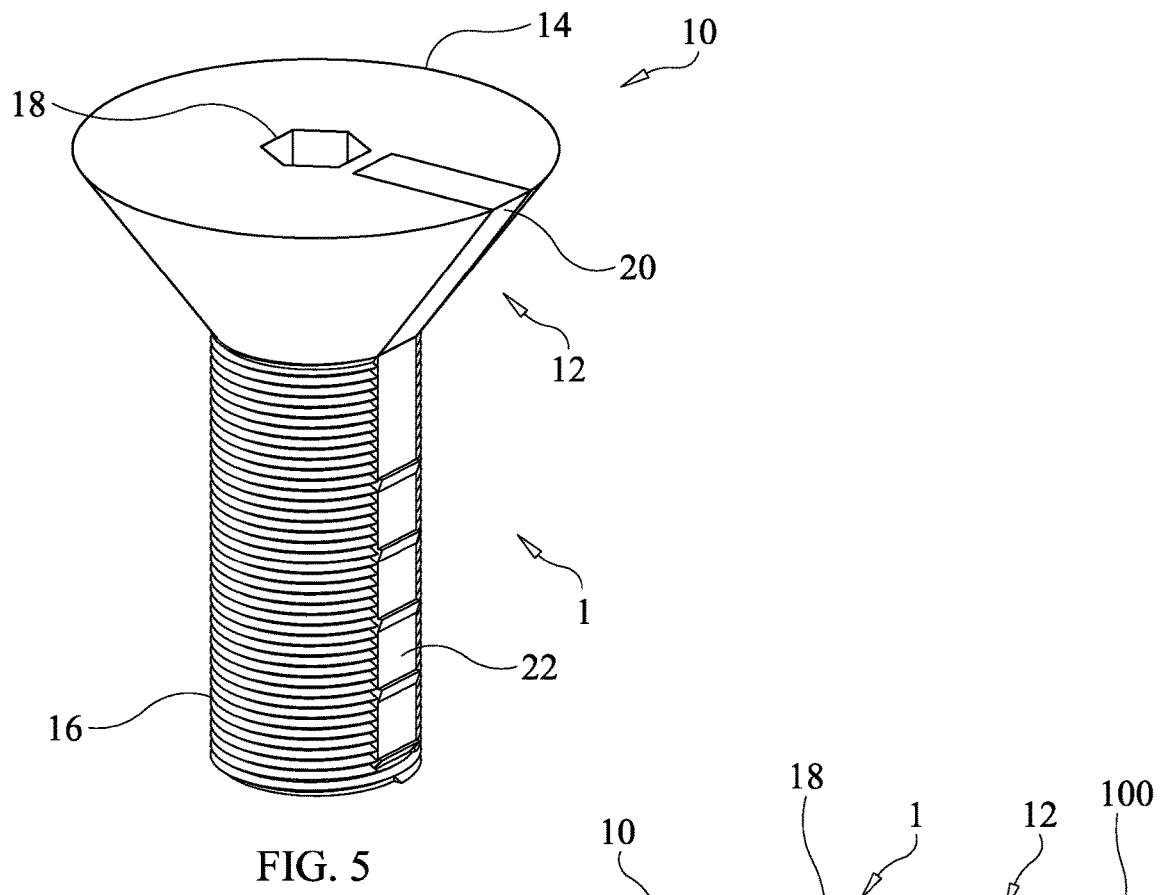
FIG. 5 is a perspective view of a fastener with a lock key retained in a key slot of a locking fastener with key in accordance with the present invention.
Figure 6:
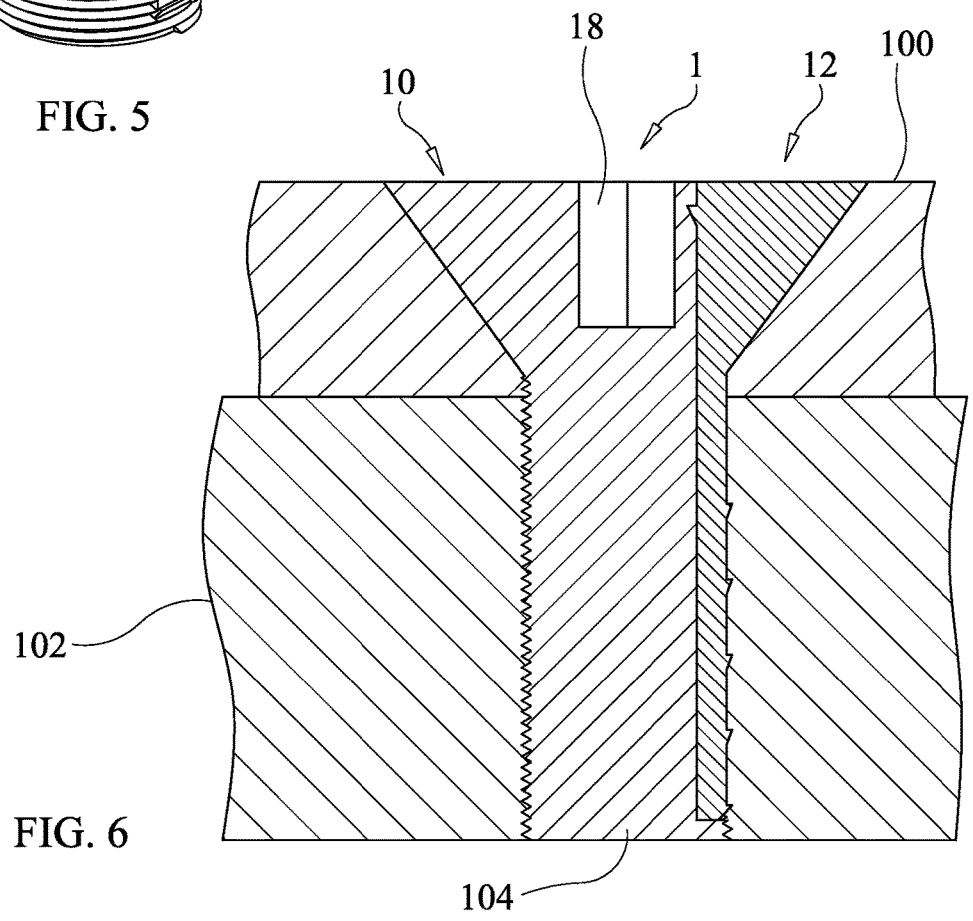
FIG. 6 is a cross sectional view of a locking fastener with key retaining two objects together in accordance with the present invention.

With reference now to the drawings, and particularly to FIG. 1, there is shown an exploded perspective view of a locking fastener with key 1. The locking fastener with key 1 preferably includes a fastener 10 and a lock key 12. The fastener 10 includes a drive head 14 and a threaded shank 16. The drive head 14 is preferably a countersunk head, but other heads could also be used. A drive cavity 18 is formed in a top of the drive head 14. The drive cavity may be a hexagon drive cavity, a square drive cavity, a Torx® drive cavity, a Philips drive cavity, a slot drive cavity or any other suitable drive cavity. The threaded shank 16 extends from a bottom of the drive head 14. The lock key 12 preferably includes a tapered head 20 and a shank 22. The shank 22 extends downward from a bottom of the tapered head 20. The tapered head 20 includes a flat top 21 and an angled relief 23. The angled relief 23 extends downward and inward toward the shank, 22 from an outer edge of the flat top 21. The angled relief 23 preferably matches an angle of the drive head 14. A head tapered projection 24 extends outward from a rear of the tapered head 20. The head tapered projection 24 includes a flat top 25 and an angled relief 27. The angled relief 27 extends downward and inward toward the tapered head 20 from an outer edge of the flat top 25. At least one shank tapered projection 26 extends outward from a front of the shank 22. The shank tapered projection 26 includes a flat top 29 and an angled relief 31. The angled relief 31 extends downward and inward toward the shank 22 from an outer edge of the flat top 29. A key slot 28 is formed in a side of the drive head 14 and a side of the threaded shank 16. The key slot 28 stops just above an opposing end of the threaded shank 16 to prevent the locking key 12 from being inserted too far downward. A head retention slot 30 is formed adjacent a top of the drive head 14 to receive the head tapered projection 24. In use, the locking fastener with key 1 is inserted through a first object 100 and tightened in a threaded hole 104 in a second object 102. The lock key 12 is inserted into the key slot 28 in the drive head 14 and forced downward, until a top of the tapered head 20 is flush with a top of the drive head 14. The head tapered projection 24 retained in the head retention slot 30 will prevent the lock key 12 from working itself upward, out of the key slot 28. The at least one shank tapered projection 26 will prevent the threaded shank 12 from rotating relative to the threaded hole 104.

While particular embodiments of the invention have been shown and described, it will be obvious to those skilled in the art that changes and modifications may be made without departing from the invention in its broader aspects, and therefore, the aim in the appended claims to cover all such changes and modifications as fall within the true spirit and scope of the invention.

I claim:

1. A locking fastener utilizing an inserted key, comprising:
    a fastener including a drive head and a threaded shank, one end of said threaded shank extends from a bottom of said drive head, a drive cavity is formed in a top axial surface of said drive head; and
    a lock key including a head and a shank, said shank extends downward from a bottom of said head, at least one shank projection extends outward from a front of said shank, a head projection extends outward from a rear of said head, a key slot is formed in a side of said drive head and said threaded shank, said key slot is sized to receive said lock key, a head retention slot is formed in said key slot to receive said head projection, where in use said fastener is inserted through a first object and tightened in a threaded hole of a second object, and said lock key is inserted through said top axial surface of said drive head into said key slot to prevent rotation of said fastener, where in use said head projection is locked in said head retention slot to prevent upward movement of said lock key.

2. The locking fastener utilizing an inserted key of claim 1 wherein:
    said head projection includes a flat head top and a head angled relief, said head angled relief extends downward and inward toward said shank from an outward edge of said flat head top.

3. The locking fastener utilizing an inserted key of claim 1 wherein:
    said key slot stops just above an opposing end of said threaded shank.

4. The locking fastener utilizing an inserted key of claim 1 wherein:
    said drive cavity has a hex shape.

5. The locking fastener utilizing an inserted key of claim 1 wherein:
    said head retention slot is formed in said key slot, adjacent a top of said drive head.

6. A locking fastener utilizing an inserted key, comprising:
    a fastener including a drive head and a threaded shank, one end of said threaded shank extends from a bottom of said drive head, a drive cavity is formed in a top axial surface of said drive head; and
    a lock key including a head and a shank, said shank extends downward from a bottom of said head, a head projection extends outward from a rear of said head, a key slot is formed in a side of said drive head and said threaded shank, said key slot is sized to receive said lock key, a head retention slot is formed in said key slot to receive said head projection, where in use said fastener is inserted through a first object and tightened in a threaded hole of a second object, and said lock key is inserted through said top axial surface of said drive head into said key slot to prevent rotation of said fastener, where in use said head projection is locked in said head retention slot to prevent upward movement of said lock key.

7. The locking fastener utilizing an inserted key of claim 6 wherein:
    said head projection includes a flat top and an angled relief, said angled relief extends downward and inward toward said shank from an outward edge of said flat top.

8. The locking fastener utilizing an inserted key of claim 6 wherein:
    said head projection includes a flat head top and a head angled relief, said head angled relief extends downward and inward toward said head from an outward edge of said flat head top.

9. The locking fastener utilizing an inserted key of claim 6 wherein:
    said key slot stops just above an opposing end of said threaded shank.

10. The locking fastener utilizing an inserted key of claim 6 wherein:
    said drive cavity has a hex shape.

11. The locking fastener utilizing an inserted key of claim 6 wherein:
    said head retention slot is formed in said key slot, adjacent a top of said drive head.

12. A locking fastener utilizing an inserted key, comprising:
    a fastener including a drive head and a threaded shank, one end of said threaded shank extends from a bottom of said drive head, a drive cavity is formed in a top axial surface of said drive head; and
    a lock key including a head and a shank, said shank extends downward from a bottom of said head, a head projection extends outward from a rear of said drive head, a plurality of shank projections extend outward from a front of said shank, a key slot is formed in a side of said drive head and said threaded shank, said key slot is sized to receive said lock key, where in use said fastener is inserted through a first object and tightened in a threaded hole of a second object, and said lock key is inserted through said top axial surface of said drive head into said key slot to prevent rotation of said fastener.

13. The locking fastener utilizing an inserted key of claim 12 wherein:
    said head projection includes a flat top and an angled relief, said angled relief extends downward and inward toward said shank from an outward edge of said flat top.

14. The locking fastener utilizing an inserted key of claim 12 wherein:
    said at least one shank projection includes a flat top and an angled relief, said angled relief extends downward and inward toward said shank from an outward edge of said flat top.

15. The locking fastener utilizing an inserted key of claim 12 wherein:
    a head retention slot is formed in said key slot, adjacent a top of said drive head to receive said head projection.

16. The locking fastener utilizing an inserted key of claim 12 wherein:

said key slot stops just above an opposing end of said threaded shank.

17. The locking fastener utilizing an inserted key of claim 12 wherein:
said drive cavity has a hex shape.

* * * * *